(12) United States Patent
Bewick et al.

(10) Patent No.: US 11,174,796 B2
(45) Date of Patent: Nov. 16, 2021

(54) ACCESSORY GEARBOX ASSEMBLY

(71) Applicant: ROLLS-ROYCE plc, London (GB)

(72) Inventors: Clare L Bewick, Derby (GB); David A Edwards, Derby (GB)

(73) Assignee: ROLLS-ROYCE PLC, London (GB)

( * ) Notice: Subject to any disclaimer, the term of this patent is extended or adjusted under 35 U.S.C. 154(b) by 23 days.

(21) Appl. No.: 16/835,674

(22) Filed: Mar. 31, 2020

(65) Prior Publication Data

US 2020/0325827 A1  Oct. 15, 2020

(30) Foreign Application Priority Data

Apr. 12, 2019 (GB) ..................... 1905189

(51) Int. Cl.
*F02C 7/32* (2006.01)
*F02C 7/22* (2006.01)

(52) U.S. Cl.
CPC ............... *F02C 7/32* (2013.01); *F02C 7/222* (2013.01); *F05D 2220/323* (2013.01)

(58) Field of Classification Search
None
See application file for complete search history.

(56) References Cited

U.S. PATENT DOCUMENTS

| | | | |
|---|---|---|---|
| 3,638,421 A | 2/1972 | Chilman | |
| 6,189,313 B1 | 2/2001 | Cass et al. | |
| 2006/0101804 A1* | 5/2006 | Stretton | F02C 7/32 |
| | | | 60/226.1 |
| 2008/0181770 A1* | 7/2008 | Russell | F02C 7/00 |
| | | | 415/182.1 |
| 2012/0117981 A1* | 5/2012 | Suciu | F02C 7/32 |
| | | | 60/802 |
| 2015/0176447 A1* | 6/2015 | Beier | F02C 7/06 |
| | | | 415/110 |
| 2015/0308351 A1* | 10/2015 | Sheridan | F02C 7/16 |
| | | | 60/39.08 |
| 2016/0222889 A1 | 8/2016 | Snyder | |
| 2019/0107056 A1* | 4/2019 | Peace | A62C 2/06 |

FOREIGN PATENT DOCUMENTS

| | | |
|---|---|---|
| EP | 1 491 806 A1 | 12/2004 |
| EP | 2 455 597 A2 | 5/2012 |
| GB | 1136584 A | 12/1968 |
| GB | 1 212 109 A | 11/1970 |

OTHER PUBLICATIONS

Aug. 27, 2020 extended Search Report issued in European Patent Application No. 20165882.0.
Search Report of the Intellectual Property Office of the United Kingdom for GB1905189.5 dated Sep. 27, 2019.

* cited by examiner

*Primary Examiner* — Todd E Manahan
*Assistant Examiner* — Alyson Joan Harrington
(74) *Attorney, Agent, or Firm* — Oliff PLC

(57) ABSTRACT

The disclosure relates to a gas turbine engine having an accessory gearbox assembly having an accessory gearbox. The accessory gearbox assembly is mounted adjacent a core of the gas turbine engine and has a support formation for supporting a conduit. The conduit extends between a first location on the engine and a second location on the engine. The first location and the second location may be spaced from the accessory gearbox such that the conduit does not operatively communicate with the accessory gearbox in use. The accessory gearbox may be axially mounted and may provide a bridge for supporting a plurality of conduits.

16 Claims, 7 Drawing Sheets

ACCESSORY GEARBOX ASSEMBLY

CROSS-REFERENCE TO RELATED APPLICATIONS

This disclosure claims the benefit of UK Patent Application No. GB 1905189.5, filed on 12 Apr. 2019, which is hereby incorporated herein in its entirety.

TECHNICAL FIELD

The present disclosure relates to accessory gearbox assembly, particularly to an accessory gearbox assembly for a gas turbine engine.

BACKGROUND OF THE DISCLOSURE

During design and assembly of gas turbine engines the need to route pipework and electrical cabling to different parts of the engine causes significant complexity. Pipes and conduits extending along the engine are secured using brackets amongst other support structures and fixings. Such brackets add significant weight to the engine core and may be positioned in locations that are difficult to access for maintenance.

Furthermore, it will be appreciated that each pipe/cable has a different source or destination on the engine, resulting in complex networks that must not interfere with other maintenance/access or safety requirements of the engine.

An accessory gearbox (AGB) is used on an aircraft engine to provide mechanical drive to accessories, such as fuel pumps, oil pumps, generators, other hydraulic systems, amongst other possible accessories. For different engine configurations and sizes, the position of the AGB can vary.

For larger turbofan engines it is known to mount the accessory gearbox to the engine core. The components of the AGB are typically arranged in a line, resulting in an elongate overall profile. A core-mounted AGB is typically mounted in a circumferential arrangement with the elongate profile of the AGB curving around the longitudinal axis of the core. Such an AGB is thus supported by the compressor casing and the circumferential arrangement follows the profile of the engine casing.

It is an aim of the present disclosure to find an alternative accessory gearbox arrangement. It may be an additional or alternative aim to find an alternative arrangement to support one or more conduits, such as pipes or cables.

According to a first aspect of the disclosure there is provided a gas turbine engine comprising: an accessory gearbox assembly comprising at least one accessory drive system and mounted adjacent a core of the gas turbine engine, such that the accessory gearbox assembly extends in an axial direction between an upstream region of the core and a downstream region of the core; the accessory gearbox assembly comprising one or more support formation for supporting at least a portion of a conduit, the conduit extending between a first location provided on the engine, and a second location, such that the accessory gearbox assembly acts as a support or bridge for the conduit part-way along the length of the conduit between the first location and the second location.

The accessory gearbox may provide a supporting bridge for a plurality of conduits.

The accessory gearbox may comprise a housing having a plurality of internal gears within an internal cavity of the housing. The support formation may be provided on an exterior of the housing. The support formation may be arranged to orient the conduit in an axial direction along the housing, e.g. in a longitudinal direction along the housing.

According to a further aspect of the disclosure, there is provided an accessory gearbox assembly for a gas turbine engine comprising: a drive shaft arranged to be driven by a shaft of the gas turbine engine in use; a plurality of internal gears within an internal cavity of the accessory gearbox assembly housing; a plurality of mounts for mounting the accessory gearbox assembly in an axial orientation on the gas turbine engine; wherein the accessory gearbox assembly further comprises one or more support formation externally of said internal cavity for supporting one or more conduits on the exterior of the gearbox assembly housing structure. One or more conduit may be supported in a manner such that it does not communicate operationally communicate with the internal cavity.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided.

By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Figure 1:
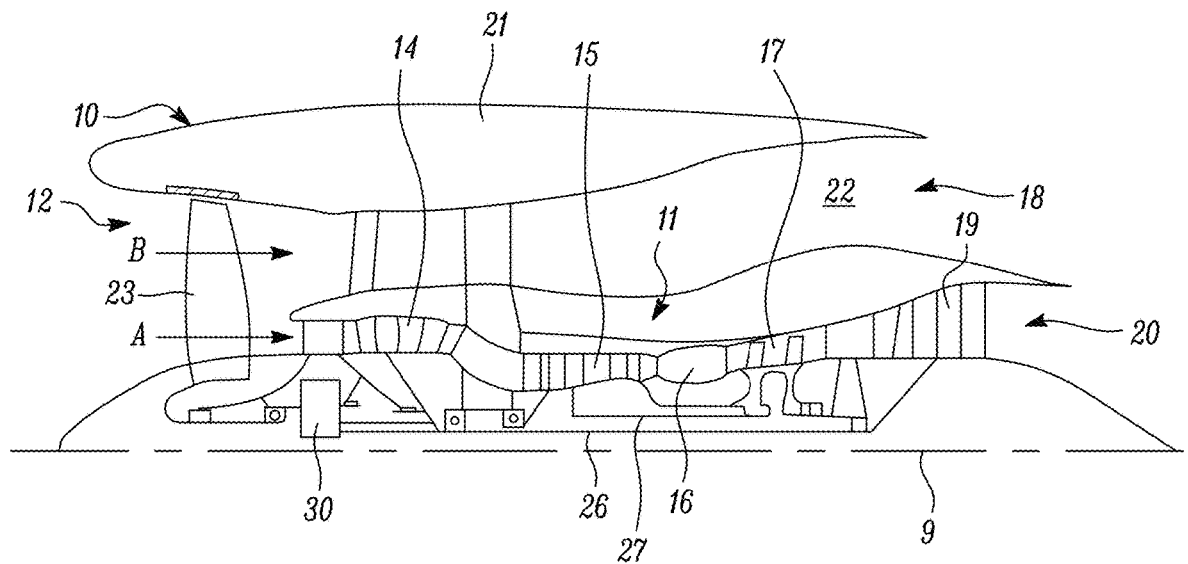
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
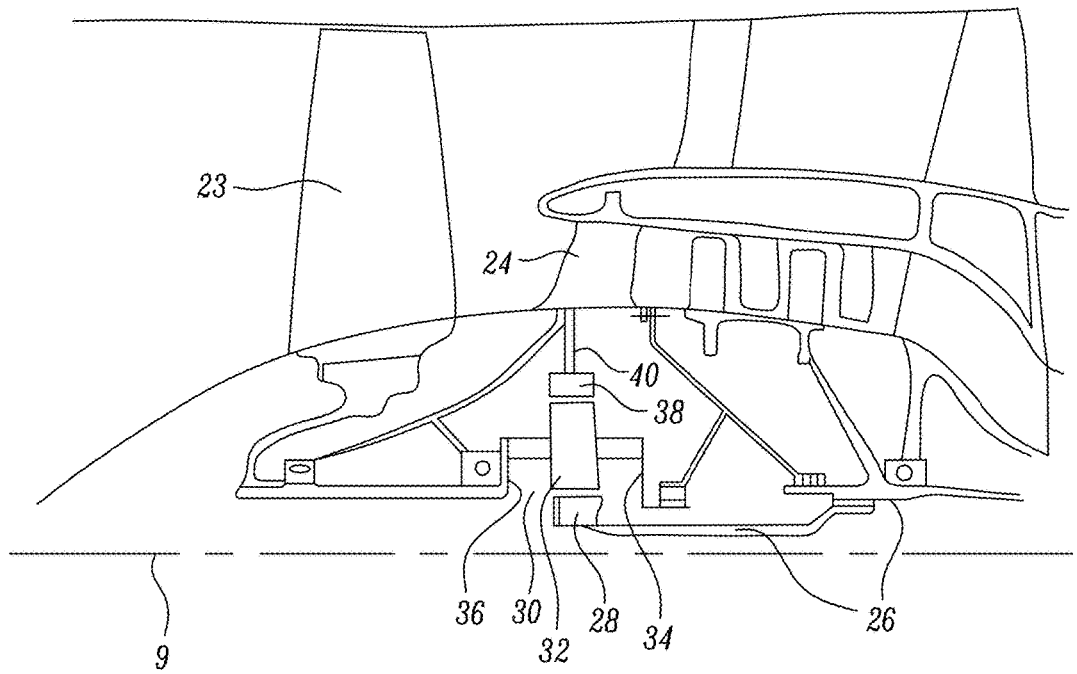
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
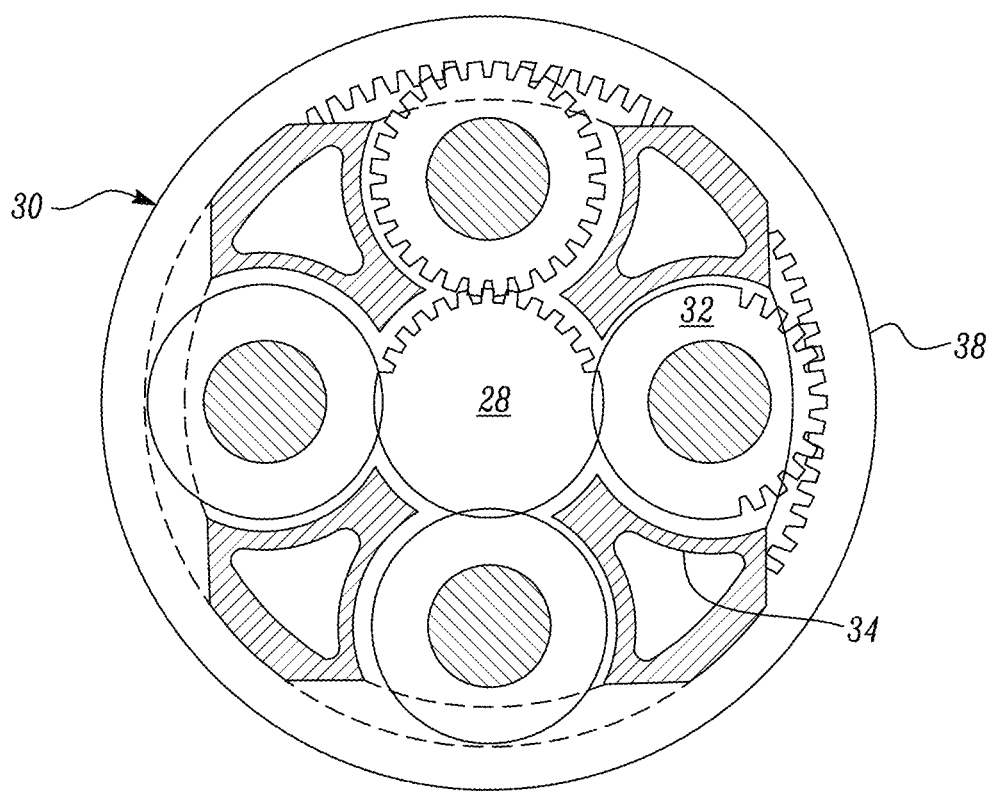
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
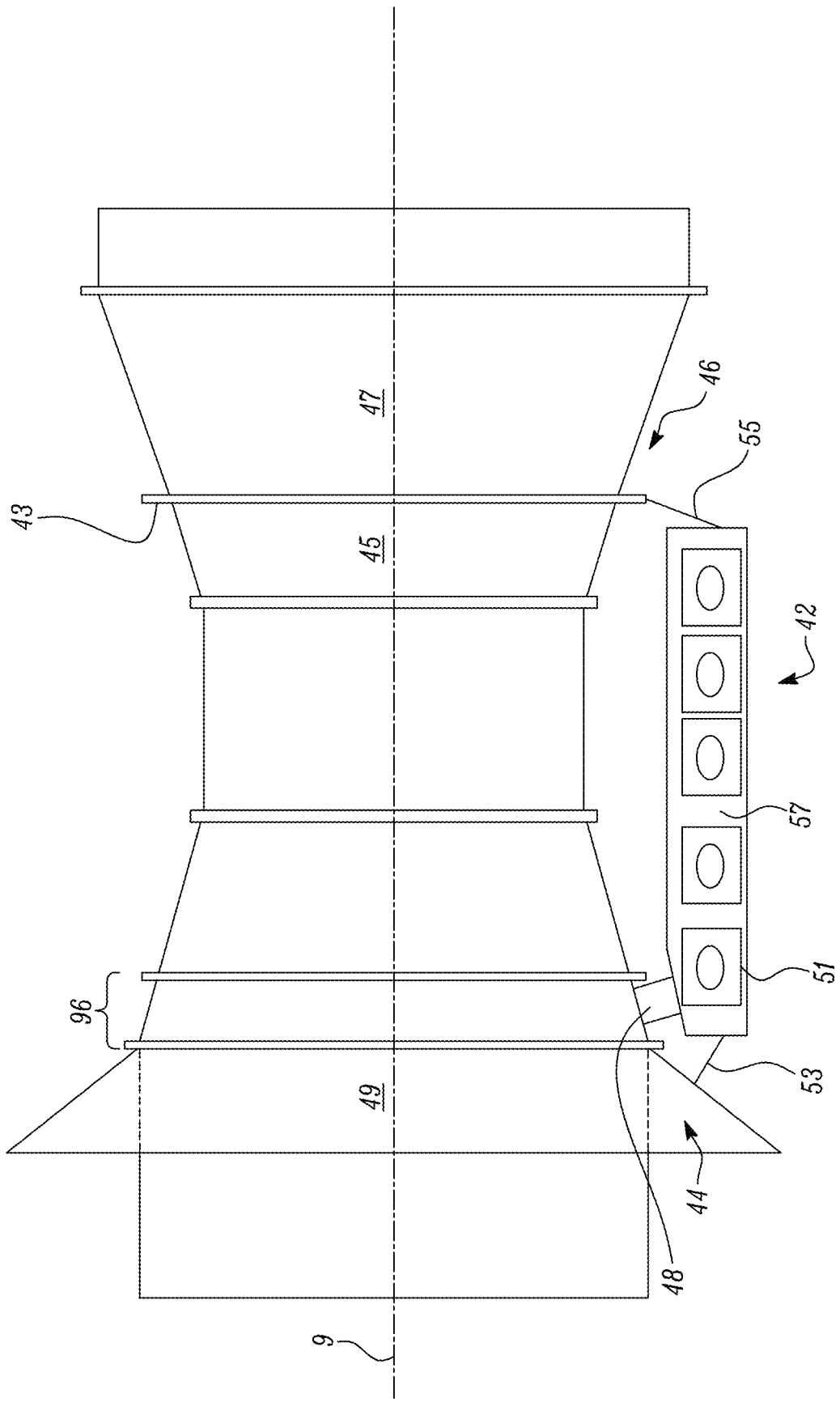
FIG. 4 shows a close up view of the an axial gearbox and an engine core.

FIG. 4 shows an accessory gearbox (AGB) 42 assembly. The AGB 42 comprises a housing 57, within which a plurality of accessory drive systems 51 are mounted. The accessory drive systems are arranged side-by-side, e.g. in series, within the housing 57, resulting in an elongate housing 57 and/or an elongate AGB 42 profile.

The accessories typically comprise one or more generators and one or more pumps. The AGB may drive any or any combination of fuel pumps, air turbine starter, oil pumps, generators, hydraulic systems, and/or motors. Each accessory is typically connected to an input shaft by a gearing such that each accessory is driven at the appropriate rotational speed. Associated units such as a hydro-mechanical unit may also be supported by the AGB.

The AGB 42 assembly is mounted adjacent the engine core 11 of the gas turbine engine. The AGB 42 assembly is mounted within the casing surrounding the core 11 (i.e. in the cavity between the core flow path A and bypass flow B). The AGB 42, e.g. the housing 57 thereof, is thus supported at different/spaced axial locations relative to the engine axis 9, e.g. at or between upstream and downstream ends of the AGB.

The AGB 42 extends axially between an upstream region 44 of the engine core 11 and a downstream region 46 of the engine core 11, i.e. spanning the combustor/central region 16. The AGB 42 is attached to the upstream region 44 and the downstream region 46 by an upstream mount 53 and a downstream mount 55, respectively. The downstream mount 55 and the upstream mount 53 may be provided on the accessory gearbox assembly housing 57, e.g. at, or towards, opposing ends thereof.

The downstream region 46 may comprise the high pressure turbine 17, the intermediate pressure turbine 19 or intermediate low pressure turbine. Accordingly, the downstream end of the AGB 42 may be adjacent the turbine casing and/or the downstream mount 55 may be attached to the turbine casing.

The AGB 42 may be attached to an intercase 96 at the forward end.

The AGB may be attached between a high pressure turbine casing 45 and an intermediate or low pressure turbine casing 47, for example, via flange 43 at the aft end.

The upstream region may comprise a low pressure compressor 14 or an intermediate/high pressure compressor. Accordingly, the upstream end of the AGB 42 may be adjacent the compressor casing and/or the upstream mount 53 may be attached to the compressor casing. The AGB assembly may be attached to low/intermediate 49 or high pressure compressor casing portion. For example, the AGB 42 could be attached to the intercase 96 or suitable fixing on the casing wall.

The AGB may be attached to the downstream region 46 and the upstream region 44 at respective ends of the accessory gearbox assembly.

The AGB 42 is mounted in this example on the underneath the engine core 11, i.e. below the level of the axis 9. The AGB 42 may be mounted directly beneath the lowermost side of the engine core 11, e.g. at a central portion thereof. The AGB 42 may be mounted adjacent a lower bifurcation extending from the core 11. The AGB 42 may be positioned adjacent an access closure provided in the core 11 casing. The closure may comprise inter alia: a door; a hatch; or a cowl.

The AGB may be mounted at bottom dead centre of the engine but could be located elsewhere, e.g. in the lower half of the engine but towards the left or right hand side, if desired.

A transmission member 48 extends between the AGB 42 and a low pressure compressor 14, and intercase 96 or an intermediate/high pressure compressor. The transmission member 48 comprises a shaft that is mechanically coupled between the compressor and AGB to transmit torque therebetween. The transmission member 48 is a rotatable shaft, e.g. a radial drive shaft. The transmission member may drive gears in the AGB via a bevel gear, e.g. mounted internally in the AGB housing 57.

Figure 5:
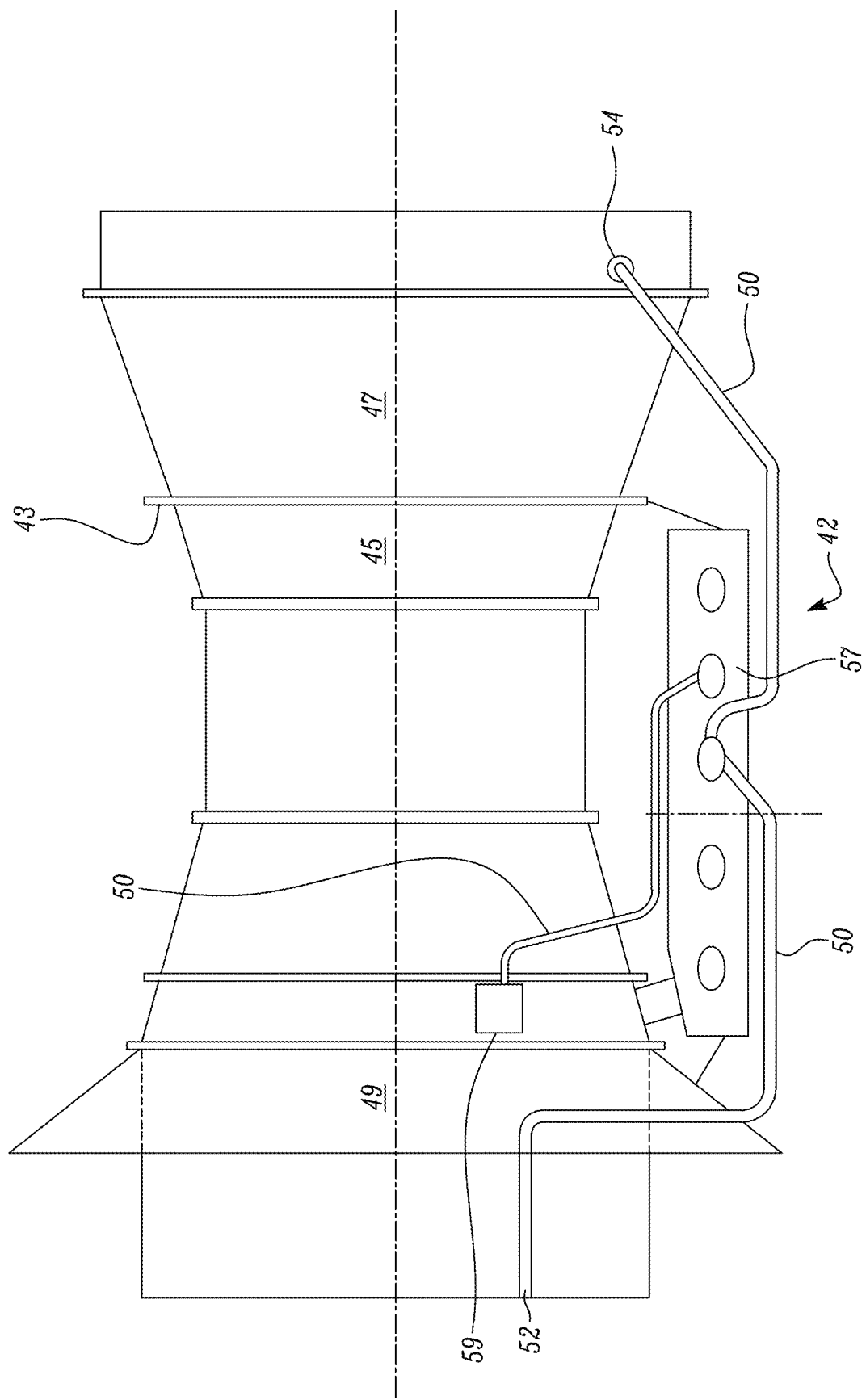
FIG. 5 shows a second close up view of an axial gearbox and an engine core.

As shown in FIG. 5, the arrangement of the AGB 42 assembly is used to support at least a portion of one physical conduit 50 using one or more support formations. The conduit 50 may comprise a conduit for, inter alia: a liquid; a gas; an electrical current; or combinations thereof. The/each conduit could be used to convey one or more fluid, e.g. as a duct or pipe or carry an electrical conductor.

The conduit 50 may comprise a conduit for one or more of, inter alia: fuel; electrical power; electrical communication; optical communication; hydraulic fluid; air; bleed air; waste; oil; lubricant; and combinations thereof.

The conduit 50 may be rigid or flexible. The conduit 50 may comprise, inter alia: a pipe; a duct; a hose; one or more electrical cable/wire; a drain; one or more fibre-optic member; and combinations thereof.

In an example, the conduit 50 does not require communication with the AGB interior (e.g. the accessory drive system 51) or the AGB electrical system itself. That is to say the AGB housing 57 can be used to support additional conduits e.g. that are not operatively in communication with the AGB.

The/each conduit 50 may extend between a first location 52 and a second location 54 provided on the gas turbine engine. The first location 52 and second location 54 comprise any location on the gas turbine requiring removal/provision/transmission of a particular medium or electrical/electronic communication provided by the conduit 50. One of the first location 52 and the second location 54 may be provided at the upstream region 44 of the engine and the other of the first location 52 and the second location 54 may be provided at downstream region 46 of the engine. Additionally or alternatively, one of the first and second location may be on the core engine 11 and the other of first location and the second location may be provided outboard, e.g. on the nacelle 21.

The first location 52 and the second location 54 are typically spaced from the AGB 42 (e.g. they are not located on, or operatively form part of, the AGB). The/each conduit 50 may not operatively communicate with the AGB, e.g. the conduit 50 does not provide a fluid/solid/electrical connection between the conduit 50 and the AGB. For example, the conduit 50 does not supply or remove fuel, oil, water, air, electrical power, or waste to/from the AGB. The/each conduit 50 may operatively bypass the AGB in use.

The first location 52 and/or the second location 54 may comprise a source/supply for a particular medium, for example: a fuel supply; an oil supply; a lubricant supply; a hydraulic pump; a pneumatic pump; a power supply; a data source etc. The first location 52 and/or the second location 54 may comprise a drain/sump/actuator, for example: a fuel spray nozzle in the combustor; a lubrication device; a hydraulic actuator; a pneumatic actuator; an electrical actuator; an ambient drain; a data processor, controller, etc.

The first location 52 and/or the second location 54 may comprise a wired transmitter, for example: a sensor; a measurement device; a fire sensor; an electrical sensor; a data collector; a thermocouple etc.

The first location 52 and/or the second location 54 may comprise a wired receiver, for example: a data processor; an actuator; a controller etc.

Additionally or alternatively, the/each conduit 50 operatively communicates with the interior of the AGB 42 (e.g. the accessory drive system 51) and substantially terminates at the AGB 42. The conduit 50 is configured to supply a medium to the interior of the AGB. The conduit 50 may extend from a third location 59 on the gas turbine engine to the AGB 42, however, it can be appreciated the origin of the conduit 50 from the gas turbine engine is trivial, and the conduit may extend from the first and/or second location.

The/each conduit 50 is supported at the terminal of the conduit 50 at the AGB 42 (i.e. the connection therebetween), however, the conduit is further supported at a further, separate location on the AGB (e.g. on the housing 57).

Various conduit support arrangements are possible and it is envisaged that a practical embodiment would involve a plurality of conduits, one or more of which communicate with the AGB 42 for its operation and one or more of which bypass the AGB. In some examples, the AGB 42 can support different types of conduits, e.g. both pipes and electrical harnesses/cabling.

The AGB 42 acts as a support or bridge for the/each conduit, e.g. between the first location 52, and the second location 54 and/or the accessory drive system 51. The AGB 42 acts as a support or bridge for the conduit 50 along an axial length of the engine. The AGB 42 may act as a support or bridge for the conduit 50 between the upstream region 44 of the engine and the downstream region 46 of the engine.

The/each conduit 50 may act to prevent movement and/or damp movement of the AGB 42.

At least a portion of the/each conduit 50 is supported by the AGB 42 via at least one support formation. The/each support formation may support an individual conduit 50 or a plurality of conduits 50, e.g. in a side-by-side arrangement. The support formation may provide a common mounting structure for a plurality of conduits 50, e.g. for a plurality of collated conduits 50 of a given type.

Figure 6:
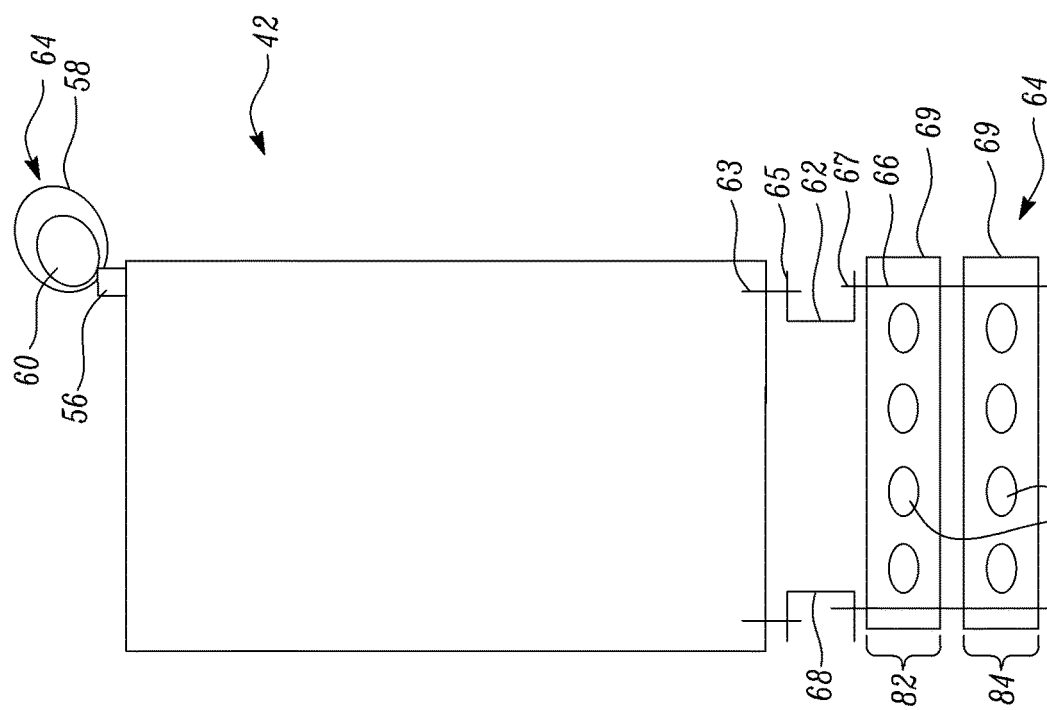
FIG. 6 shows a close up sectional view of the axial gearbox.
Figure 7:
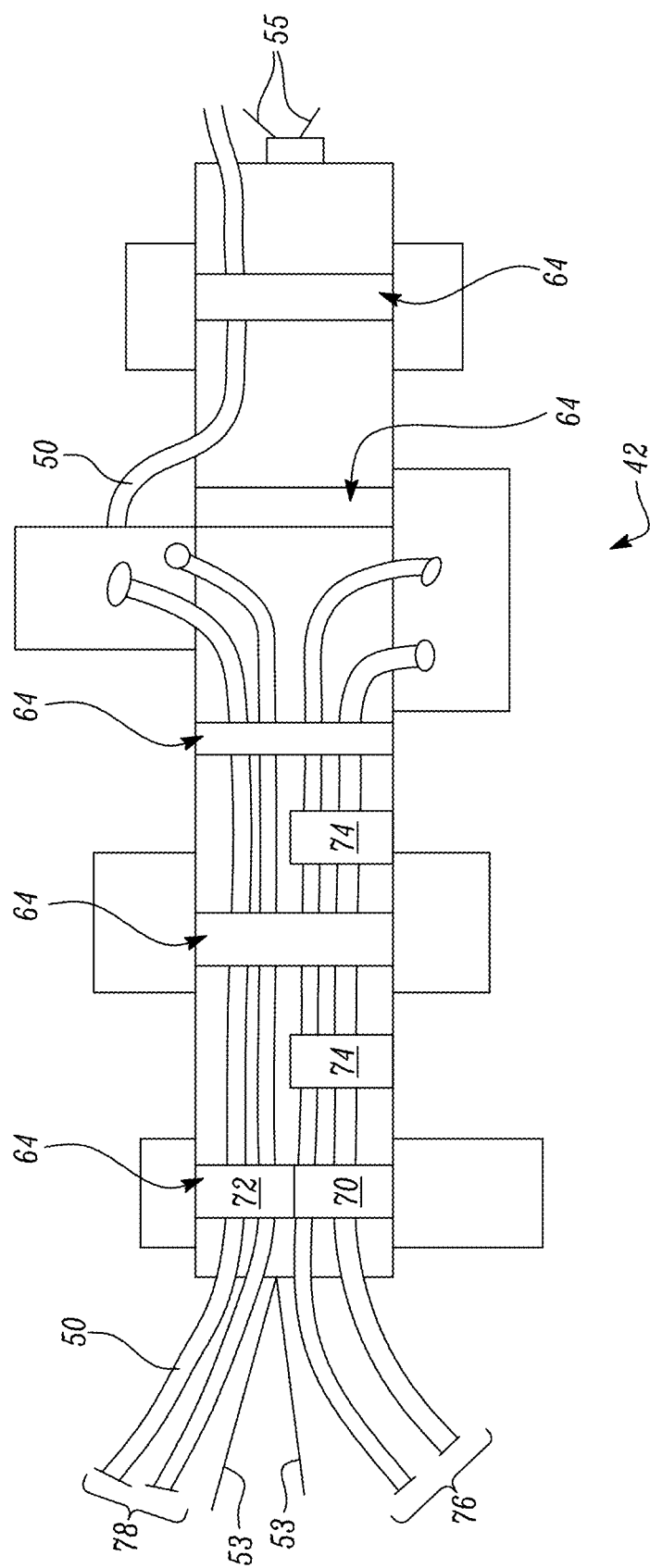
FIG. 7 shows an underside view of the axial gearbox.

As shown in FIGS. 6 and 7, the support formation may comprise a holding member 64 depending from the AGB housing or a mount thereof. The holding member 64 engages the conduit 50 to secure the conduit 50 therein. The holding member 64 may comprise two opposing portions secured together to engage the conduit 50, or else a loop member closed around the conduit. The conduit 50 may be releasably secured by the holding member 64.

Two opposing portions of the holding member 64 may be attached via at least one hinge and/or flexible portion. The holding member 64 may comprise a clamp. The holding member 64 may comprise a clamp block. The holding member may comprise a P-clip. The holding member may comprise, inter alia: clip; a spring clip; a cable tie; an R-clip; or a hose clamp.

A plurality of holding members 64 may be provided. Each of the plurality of the holding members 64 may hold a conduit of a different type (for example, a fuel line, an oil line, a hydraulic line, an electrical line, a data line etc.) to provided conduits 50 segregated according to the type of conduit.

The holding member 64 may secure a plurality of conduits 50. The conduits 50 may comprise substantially the same type of conduits (i.e. a fuel line, an oil line, a hydraulic line, an electrical line, a data line etc.) such that the holding member 64 collates a plurality of conduits of substantially the same type. One or more further holding members may be provided to collate a plurality of conduits for a second type of conduit, to provide a plurality of segregated and collated conduits 50. In an example, a first holding member 64 may span a plurality of fuel lines and a second holding member may span a plurality of oil lines to provide segregation of the fuel lines and the oil lines.

The support formation may comprise at least one boss 56. The boss 56 may comprise an upstanding eyelet. The boss 56 may be provided on the accessory gearbox casing 57. The boss 56 may be provided on an upper, lower or side surface of the AGB 42.

The boss 56 is configured to allow attachment of a holding member 64. The holding member may comprise a P-clip 58. The P-clip 58 comprises an aperture 60 in which the conduit may be secured in use.

The support formation may comprise plurality of bosses 56. The plurality of bosses 56 may be aligned to provide a linear support for a conduit 50 at a plurality of locations axially spaced along the length of the AGB. The plurality of bosses 56 may be angled with respect to one another to provide an angled portion for a conduit 50. The plurality of bosses 56 may be provided on different surfaces (i.e. upper, lower or side surfaces) of the axial gearbox 42 to provide the angled portion for the conduit 50. The plurality of bosses 56 may be adjacent one another to provide support for a plurality of adjacent conduits 50.

The support formation may comprise a common mounting structure for mounting a plurality of conduits. The common mounting structure may comprise a rail system. The rail system may be attached to the accessory gearbox casing/housing 57.

The rail system comprises a bracket or rail 62. The rail 62 comprises a substantially continuous section extending over or along a portion of the axial gearbox 42. The rail 62 may extend over an upper, lower or side surface or combinations thereof. The rail 62 may extend axially along the axial gearbox 42. The rail 62 may extend at any desired angle over the axial gearbox. The rail 62 may comprise a continuous portion extending the length of the rail system. Alternatively, the rail 62 may comprise a plurality of discrete portions extending the length of the rail system.

The/each rail 62 is affixed to the axial gearbox 42 via one or more fixing 63. The fixing 63 may comprise a plurality of discrete fixings, e.g. releasable fasteners, disposed along the length of the rail 62, such as screws, bolts or other fasteners, which may engage an aperture formed on the rail 62.

One or more holding member 64 may be attached along the/each rail 62.

Additionally or alternatively, holding member 69 is affixed to the common mounting structure. The holding member 69 may be affixed to the rail 62. The holding member 69 may be affixed to the rail 62 via one or more fixing/fastener 66, e.g. akin to the fixing(s) 63 described above.

The bracket/rail 62 may be substantially U-shaped or Z-shaped, e.g. in section. A first flange portion 65 of the U-shaped rail is affixed to the axial gearbox assembly via the fixing 63. A second flange portion 67 of the rail may be affixed to the holding member 69. Thus the rail may provide a channel for one or more conduit itself and/or may provide a mount for one or more further holding member.

In various examples, a plurality of brackets/rails 62 may be used, e.g. extending in a parallel direction. In the example shown a pair of opposing rails 62 extend along opposing lateral edges of the AGB housing.

The holding member 69 may extend between and/or be affixed to a first rail 62 and the one or more further rails 68. The holding member 69 may comprise a clamp, rack or shelf formation. Such a formation may provide an elongate enclosure 69 extending transversely and/or longitudinally relative to the AGB housing, e.g. so as to secure the one or more conduit 50 therein.

A plurality of rows or layers of holding members 69 may define a rack/shelf structure in which a plurality of sets of conduits can be grouped a routed over the support structure provided by the AGB housing.

The holding member 69 may be attached directly to the AGB housing 57 (i.e. not using the rail system or a boss). The holding member 64 may be releasably attached to the AGB 42, e.g. using fasteners as described above.

A shown in FIG. 7, the AGB 42 may comprise a plurality of spaced holding members 64 or 69. The conduit 50 may extend between two or more of the holding members such the conduit is supported at two or more locations on the AGB. The holding members 64, 69 may be spaced axially along the AGB 42.

The spacing of the holding members 64 may be substantially uniform or may vary. The spacing of the holding members 64 may vary between the collated conduits 50. For example, a first plurality of collated conduits 76 may have a reduced holding member spacing compared to a second plurality 78 of collated conduits. The first plurality of collated conduits 76 may comprise one or more intermediate holding members 74 spanning the first plurality of conduits. The spacing of the holding members 64 may according to the design specification of the conduit 50 types.

The AGB 42 may comprise a plurality of transversely displaced (i.e. side by side) holding members. The transversely displaced holding members may comprise a first holding member 70 adjacent a second holding member 72, e.g. for supporting conduits of different types.

A plurality of holding members 64/69 may be attached to one another. The plurality of holding members 64/69 may be arranged to provide a stacked or layered arrangement, e.g. with different/adjacent layers being integral or releasably attached.

The first holding member 69 comprises a first layer 82 of one or more conduits 50. The second holding member 69 comprises a second layer 84 of one or more conduits 50. The stacked or layered arrangement may provide segregation between two or more types of conduit. For example, the first layer 82 of conduits may comprise a plurality of collated conduits of a first type and the second layer 84 of conduits may comprise a plurality of collated conduits of a second type.

Segregation of two or more different conduit types may be provided by displacement of the holding members 64 about the accessory gearbox assembly. Any number of holding members 64 may be provided for segregation of any number of conduit types or groups.

The AGB assembly may comprise a plurality of holding members 64 displaced about different surfaces thereof. The different surfaces may comprise an upper surface, a lower surface or a side surface of the AGB housing.

The support may be provided on an outer portion of the axial gearbox 42 (i.e. on the outer surface of the axial gearbox housing/casing 57). The support may be provided on an inner portion of the axial gearbox assembly 42 (i.e. on the inner surface of the axial gearbox casing 57).

The AGB housing/casing 57 may comprise one or more formation for maintaining, supporting or constraining the/ each conduit 50. The formation could be integrally formed with the casing. For example, the formation could comprise one or more opening or channel through the casing itself, e.g. such that the conduit(s) pass through the casing structure so as to be supported thereby.

Figure 8:
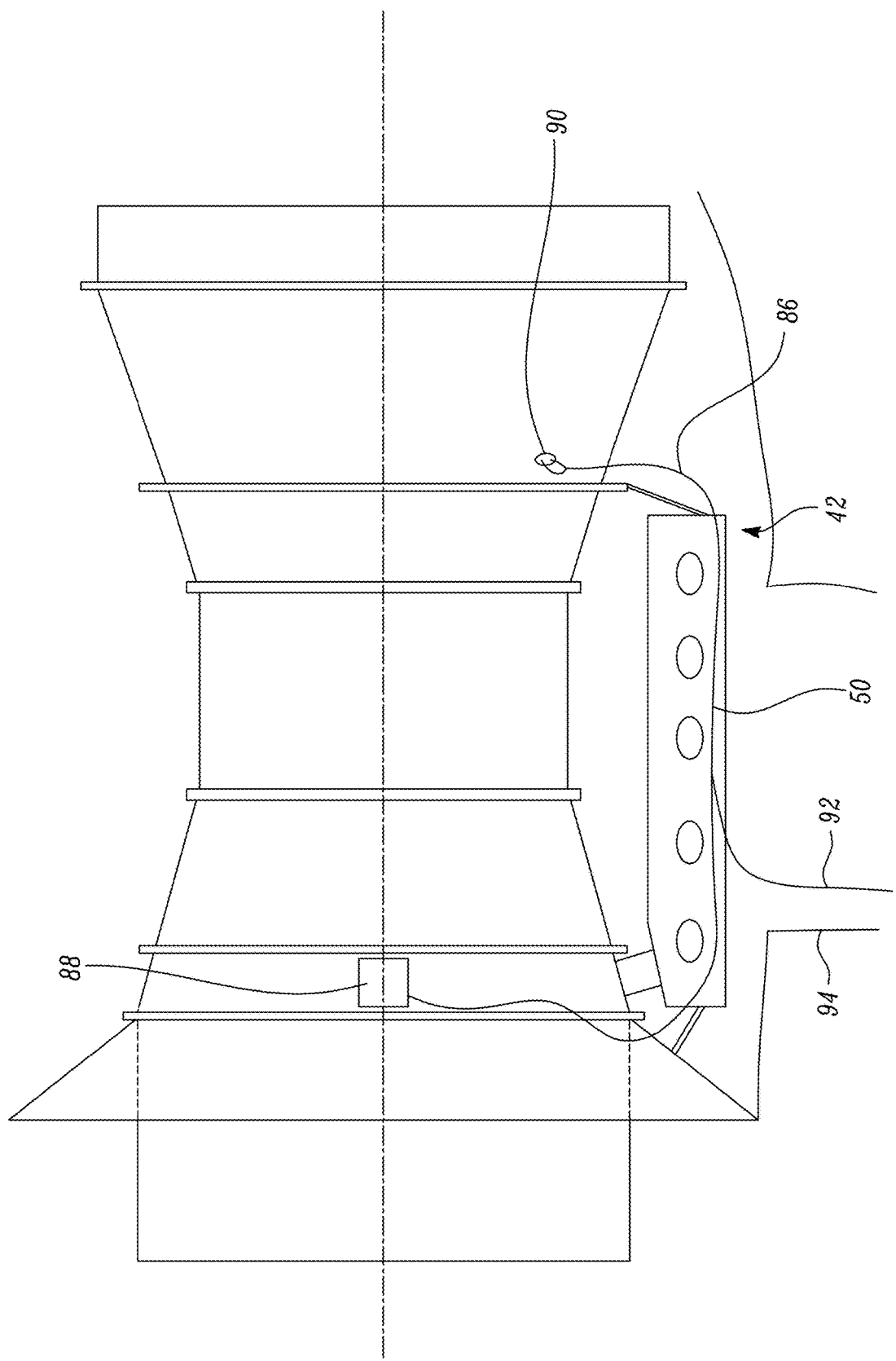
FIG. 8 shows a third close up view of an axial gearbox and an engine core.

As shown in FIG. 8, the support formation may comprise the AGB casing 57. The/each conduit 50 may be supported by, but not affixed or attached to, the accessory gearbox casing 57.

For example, the conduit 50 may comprise an electrical wire 86. The electrical wire extends from a core data collector 88 provided on the compressor casing. The electrical wire may further connect to a thermocouple 90 provide on the turbine casing. The electrical wire is supported by the AGB casing 57, providing a bridge between the compressor casing and the turbine casing. A further electrical wire 92 is provided between the thermocouple 90 and a fan casing. A portion of the further electrical wire 92 is supported by the AGB casing 57 and a further portion exits the AGB casing 57 and extends into a lower bifurcation 94. The electrical wires may be collated within the AGB casing 57.

The conduit(s) 50 may be secured or mounted to the AGB before or after mounting of the AGB to the engine core. Testing of the conduit 50 may be performed before mounting of the accessory gearbox assembly 42 to the engine. Testing may comprise, for example, testing for pressure integrity.

The accessory gearbox assembly 42 including the conduit 50 is mounted as single unit onto the gas turbine engine at the upstream region 44 and the downstream region 46 the downstream region 44 of the core 11. The one or more free ends of the conduit 50 are then attached to their respective locations on the engine.

Advantages of the Accessory Gearbox Assembly

The AGB assembly may increases the ease of inspection and/or maintenance of the engine.

The AGB assembly may permit reduction of the nacelle diameter.

The AGB assembly may permit a reduction of the drag of the nacelle.

The AGB assembly may reduce the need for supporting brackets etc. for the conduits.

The AGB assembly may reduce the weight of the core.

The AGB assembly may reduce the congestion of the core.

The AGB assembly may reduce relative movement between the pipes and the accessory gearbox assembly.

The AGB assembly may increase damping of the movement of the accessory gearbox.

The AGB assembly may reduce the time and/or complexity of the engine assembly process.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A gas turbine engine comprising:
   an accessory gearbox assembly comprising at least one accessory drive system and mounted adjacent a core of the gas turbine engine, such that the accessory gearbox assembly extends in an axial direction between an upstream region of the core and a downstream region of the core;

the accessory gearbox assembly comprising one or more support formations for supporting at least a portion of a conduit, the conduit extending between a first location provided on the gas turbine engine, and a second location, such that the accessory gearbox assembly acts as a support or bridge for the conduit part-way along a length of the conduit between the first location and the second location, wherein the accessory gearbox assembly is attached to the core, at an aft end of the accessory gearbox assembly, with a downstream mount connected to a flange extending from the core, and the accessory gearbox assembly is attached, at a fore end of the accessory gearbox assembly, with an upstream mount directly connected to a casing of a compressor of the gas turbine engine;

wherein the conduit includes a plurality of conduits each having at least a portion that is mounted to the accessory gearbox assembly and that extends parallel to a longitudinal axis of the accessory gearbox assembly.

2. The gas turbine engine according to claim 1, wherein:
the first location and the second location are spaced from the accessory gearbox assembly such that the conduit does not operatively communicate with the accessory drive system or an interior of the accessory gearbox assembly in use.

3. The gas turbine engine according to claim 1, wherein:
the accessory gearbox assembly supports a plurality of conduits including the conduit, and at least one conduit of the plurality of conduits is operatively connected to the accessory gearbox assembly and terminates thereon.

4. The gas turbine engine according to claim 1 wherein:
the gas turbine engine has a principal rotational axis, the accessory gearbox assembly being mounted such that the longitudinal axis is parallel with the principal rotational axis.

5. The gas turbine engine according to claim 1, wherein the accessory gearbox assembly spans a combustor region of the core in the axial direction.

6. The gas turbine engine according to claim 5 wherein:
the accessory gearbox assembly spans a compressor casing of the gas turbine engine and a turbine casing of the gas turbine engine.

7. The gas turbine engine according to claim 1 wherein:
the one or more support formations comprises a retainer for the conduit, the conduit including one or more conduits, on a housing of the accessory gearbox assembly.

8. The gas turbine engine according to claim 7 wherein:
the one or more support formations the common mounting structure comprises a common retaining/mounting structure for supporting a plurality of conduits; and
the retainer is secured to the common retaining/mounting structure.

9. The gas turbine engine according to claim 1 wherein:
the one or more support formations comprises a rail or rack.

10. The gas turbine engine according to claim 9 wherein:
the rail is U-shaped.

11. The gas turbine engine according to claim 9 wherein:
the rack comprises a plurality of rows.

12. The gas turbine engine according to claim 7 wherein:
where the retainer comprises a clamp or clip.

13. The gas turbine engine according to claim 1 wherein:
the conduit comprises one or more of: a fuel line; a water line; an electrical wire; a hydraulic line; a pneumatic line; a drain; an air line; a waste line; an oil line; a lubricant line; or a fibre optic.

14. The gas turbine engine according to claim 1:
the core comprising a turbine, the compressor, and a core shaft connecting the turbine to the compressor;
a fan located upstream of the core, the fan comprising a plurality of fan blades; and
a propulsion gearbox that receives an input from the core shaft and outputs drive to the fan so as to drive the fan at a lower rotational speed than the core shaft.

15. The gas turbine engine according to claim 14, wherein:
the turbine is a first turbine, the compressor is a first compressor, and the core shaft is a first core shaft;
the core further comprises a second turbine, a second compressor, and a second core shaft connecting the second turbine to the second compressor; and
the second turbine, second compressor, and second core shaft are arranged to rotate at a higher rotational speed than the first core shaft.

16. An accessory gearbox assembly for a gas turbine engine comprising:
a drive shaft arranged to be driven by a shaft of the gas turbine engine in use;
a plurality of internal gears within an internal cavity of an accessory gearbox assembly housing,
a plurality of mounts, including an upstream mount and a downstream mount, for mounting the accessory gearbox assembly in an axial orientation on the gas turbine engine,
wherein the accessory gearbox assembly further comprises one or more support formations externally of said internal cavity for supporting one or more conduits on an exterior of the accessory gearbox assembly housing,
wherein the accessory gearbox assembly is configured to be attached to a core of the gas turbine engine, at an aft end of the accessory gearbox assembly, with the downstream mount connected to a flange extending from the core, and the accessory gearbox assembly is configured to be attached, at a fore end of the accessory gearbox assembly, with the upstream mount directly connected to a casing of a compressor of the gas turbine,
wherein the one or more conduits includes a plurality of conduits each having at least a portion that is mounted to the accessory gearbox assembly and that extends parallel to a longitudinal axis of the accessory gearbox assembly.

* * * * *